(12) United States Patent
Patton et al.

(10) Patent No.: US 8,996,981 B2
(45) Date of Patent: Mar. 31, 2015

(54) MANAGING FORMS IN ELECTRONIC DOCUMENTS

(75) Inventors: John Patton, Marietta, GA (US); Jordan Phegley, Marietta, GA (US)

(73) Assignee: Onevizion, Inc., Marietta, GA (US)

( * ) Notice: Subject to any disclaimer, the term of this patent is extended or adjusted under 35 U.S.C. 154(b) by 56 days.

(21) Appl. No.: 13/225,637

(22) Filed: Sep. 6, 2011

(65) Prior Publication Data

US 2013/0061124 A1 Mar. 7, 2013

(51) Int. Cl.
*G06F 17/00* (2006.01)
*G06F 17/24* (2006.01)

(52) U.S. Cl.
CPC .................................. *G06F 17/243* (2013.01)
USPC ........................................ 715/222; 715/221

(58) Field of Classification Search
CPC ...................................................... G06Q 10/10
USPC ........................... 715/200, 209, 212, 221–224
See application file for complete search history.

(56) References Cited

U.S. PATENT DOCUMENTS

| | | | | |
|---|---|---|---|---|
| 7,415,672 | B1 * | 8/2008 | Fortini et al. | 715/760 |
| 7,426,496 | B2 * | 9/2008 | Kristjansson | 706/10 |
| 7,917,842 | B2 * | 3/2011 | Garrison | 715/224 |
| 8,407,579 | B2 * | 3/2013 | Raja et al. | 715/212 |
| 2002/0054105 | A1 * | 5/2002 | Breuer et al. | 345/764 |
| 2004/0135806 | A1 * | 7/2004 | Pickering et al. | 345/760 |
| 2007/0192678 | A1 * | 8/2007 | Tang et al. | 715/505 |
| 2009/0089653 | A1 * | 4/2009 | Campbell et al. | 715/209 |
| 2009/0094538 | A1 * | 4/2009 | Ringler | 715/760 |
| 2010/0251092 | A1 * | 9/2010 | Sun | 715/222 |
| 2011/0219293 | A1 * | 9/2011 | Maxwell et al. | 715/226 |
| 2012/0054593 | A1 * | 3/2012 | Naderi | 715/224 |
| 2013/0097480 | A1 * | 4/2013 | Allison et al. | 715/223 |

OTHER PUBLICATIONS

Microsoft, Microsoft Access 2007 Create a split form, Dec. 20, 2010 (wayback date), pp. 1-3.*
Adobe, Adobe Acrobat 8 Standard Users Guide, published 2007, pp. 1-2 and 78.*
Sun Microsystems, StarOffice 8 Getting Started Guide, published Jun. 2005, pp. 1-2 & 7.*

* cited by examiner

*Primary Examiner* — Manglesh M Patel
(74) *Attorney, Agent, or Firm* — Morris, Manning & Martin, LLP; Daniel E. Sineway, Esq.

(57) ABSTRACT

Disclosed are various embodiments for managing forms, for example, in portable document format (PDF) documents or other electronic documents. An electronic document that includes a form having multiple form fields is obtained. Each of the form fields is associated with multiple form field definitions. A data grid that shows the form field definitions for each of the form fields in the form is rendered for display. User input relative to the data grid is obtained, and the user input indicates a requested change to several of the form fields. The requested change to the plurality of the form fields is implemented in the electronic document in response to the user input.

22 Claims, 9 Drawing Sheets

MANAGING FORMS IN ELECTRONIC DOCUMENTS

BACKGROUND

Portable Document Format (PDF) is a standard found in common use for electronic documents. PDF is used to represent electronic documents in a way that is independent of application software, hardware, and operating systems. Each PDF file encapsulates a description of a fixed layout, flat document, including the text, fonts, graphics, and other information used to display it. Some PDF files include a field capability that, when used in a PDF, facilitates the creation of forms that may be filled out by the user. The completed PDF form may be saved electronically or printed. PDF-based forms are popular because they support autonomous and disconnected operation.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

The present disclosure relates to creating and manipulating forms in electronic documents such as PDF files or other electronic documents. While PDF forms provide a convenient electronic replacement for traditional paper forms, PDF forms can be very inconvenient to manage, especially when managing bulk forms or many different PDF forms. Also, it may be difficult to apply changes to multiple form objects (i.e., fields) at the same time. Such changes may relate to field definitions such as, for example, font, drop-down lists, positions, sizes, etc. Further, in certain situations, a user may have to fill out a multitude of different PDF forms, which may be difficult to process automatically due to different respective form field naming conventions.

Various embodiments of the present disclosure facilitate editing and other processing of forms in electronic documents, such as PDF forms or other forms. A data grid may be displayed in conjunction with a PDF form to allow the form fields of a PDF form to be viewed and manipulated with bulk operations. A form field shaper utility may be provided to insert or modify existing form fields through a graphical user interface. Multiple different PDF forms in multiple PDF files may be combined into a single electronic document to facilitate efficient data collection. Various embodiments of the present disclosure facilitate a significant savings relating to labor to maintain form appearances, such as mass changes of fonts, alignments, field sizes, etc. Moreover, data integrity may be maintained through mass updates to drop-down lists, mass updates of field names to match data dictionary standards, and so on. In the following discussion, a general description of the system and its components is provided, followed by a discussion of the operation of the same.

Figure 1:
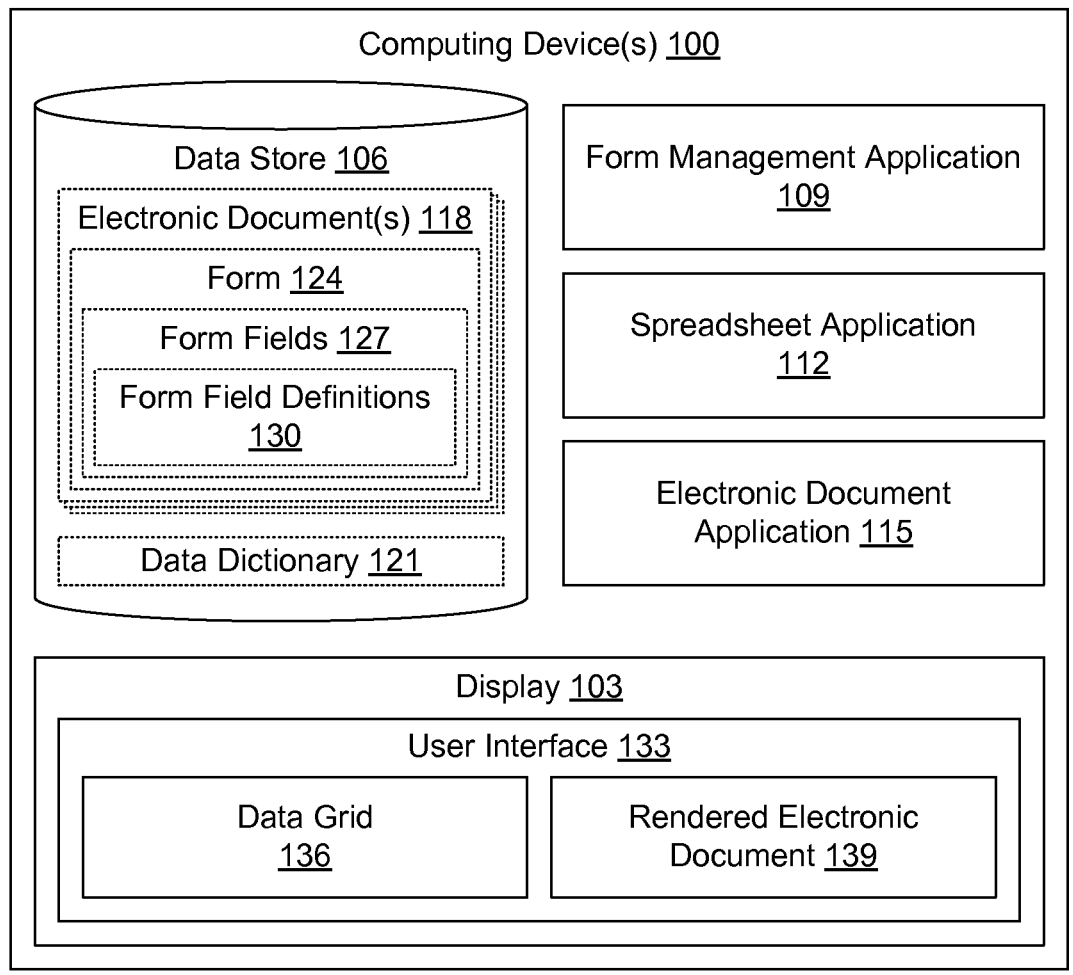
FIG. 1 is a drawing of a computing device according to various embodiments of the present disclosure.

With reference to FIG. 1, shown is a computing device 100 according to various embodiments. The computing device 100 may comprise, for example, a server computer, a desktop computer, a laptop computer, personal digital assistants, cellular telephones, smartphones, set-top boxes, music players, web pads, tablet computer systems, game consoles, electronic book readers, or other devices with like capability. The computing device 100 may include a display 103. The display 103 may comprise, for example, one or more devices such as cathode ray tubes (CRTs), liquid crystal display (LCD) screens, gas plasma-based flat panel displays, LCD projectors, or other types of display devices, etc.

Alternatively, a plurality of computing devices 100 may be employed that are arranged, for example, in one or more server banks or computer banks or other arrangements. For example, a plurality of computing devices 100 together may comprise a cloud computing resource, a grid computing resource, and/or any other distributed computing arrangement. Such computing devices 100 may be located in a single installation or may be distributed among many different geographical locations. For purposes of convenience, the computing device 100 is referred to herein in the singular. Even though the computing device 100 is referred to in the singular, it is understood that a plurality of computing devices 100 may be employed in the various arrangements as described above.

Various applications and/or other functionality may be executed in the computing device 100 according to various embodiments. Also, various data is stored in a data store 106 that is accessible to the computing device 100. The data store 106 may be representative of a plurality of data stores 106 as can be appreciated. The data stored in the data store 106, for example, is associated with the operation of the various applications and/or functional entities described below.

The components executed on the computing device 100, for example, include a form management application 109, a spreadsheet application 112, an electronic document application 115, and other applications, services, processes, systems, engines, or functionality not discussed in detail herein. The form management application 109 is executed to obtain metadata describing a form in an electronic document and to generate a user interface for managing the form. The user interface for managing the form facilitates bulk transformations for the form such that multiple form fields or form field definitions may be manipulated or modified through a single operation.

The spreadsheet application 112 is executed to provide a portion of the user interface generated by the form management application 109. In one embodiment, a spreadsheet containing a data grid is generated by the form management application 109. The cells of the data grid are mapped by the form management application 109 to form field definitions of an electronic document. Operations supported by the spreadsheet application 112 may be employed to transform the form of the electronic document. In various embodiments, the spreadsheet application 112 may correspond to a commercially available application such as Microsoft® Excel®, Apple® Numbers, OpenOffice.org Calc, and so on.

The electronic document application 115 is executed to facilitate reading, creating, and/or modifying electronic documents such as PDF files. The electronic document application 115 may allow creation of forms in electronic documents and/or filing out forms in electronic documents. Non-limiting examples of commercially available electronic document applications 115 include Foxit® Phantom®, Foxit® Reader, Adobe® Reader, Adobe® Acrobat®, Nuance® PDF Reader, and so on. The form management application 109 may interact with the electronic document application 115 by way of an application programming interface (API) or other approach.

The data stored in the data store 106 includes, for example, electronic documents 118, a data dictionary 121, and potentially other data. The electronic documents 118 correspond to PDF files and/or other types of electronic documents. The electronic documents 118 may correspond to multi-page documents. The electronic documents 118 may each include one or more forms 124. Each form 124 may have one or more form fields 124. The form fields 124 may correspond, for example, to text input boxes, checkboxes, radio buttons, buttons, drop-down boxes, and/or other types of form fields. Each form field 124 may be associated with a plurality of form field definitions 130 such as, for example, field name, field type, field action, page number, position relative to a page dimension, font, color, size, and other field definitions. The data dictionary 121 may include standardized data for use, for example, in normalizing options for drop-down boxes, color of field elements (e.g., border, background, etc.) or other form fields 127.

The display 103 may show a user interface 133 rendered by the form management application 109, the spreadsheet application 112, and/or the electronic document application 115. The user interface 133 may include a data grid 136, a rendered electronic document 139, and/or other components. The data grid 136 may correspond to a selection and presentation interface of the form management application 109 generated in conjunction with the spreadsheet application 112. The rendered electronic document 139 may correspond to a presentation of an electronic document 118 that is currently loaded for management by the form management application 109. In various embodiments, the rendered electronic document 139 corresponds to a temporary file that reflects changes undertaken through the form management application 109 before those changes are saved to the electronic document 118 in the data store 106.

Next, a general description of the operation of the various components of the computing device 100 is provided. To begin, a user may load an electronic document 118 using the electronic document application 115. The electronic document 118 may include one or more forms 124. From the electronic document application 115, the user may be able to launch the form management application 109. Alternatively, the user may launch the form management application 109 and select an electronic document 118 or set of electronic documents 118. For example, the user may specify a directory for the form management application 109 and all electronic documents 118 within that directory may be loaded. The electronic document(s) 118 are read into memory, and the metadata describing the forms 124 is obtained by the form management application 109.

From the metadata, the form management application 109 is able to generate a data grid 136 that displays the form field definitions 130 for the form fields 127 of the form 124. In one embodiment, the data grid 136 corresponds to a spreadsheet. The data grid 136 may be displayed by the spreadsheet application 112. In one embodiment, the data grid 136 may be displayed on one display 103 and the rendered electronic document 139 may be displayed on another display 103. Which display 103 of multiple displays 103 is employed for the electronic document 118 or the data grid 136 may be a user configurable parameter of the form management application 109.

The contents of the data grid 136 may be linked to the forms 124 of the rendered electronic document 139. When a user selects one or more cells in the data grid 136, the corresponding form fields 127 may be highlighted automatically in the rendered electronic document 139. When a form field definition 130 for a form field 127 is updated in the data grid 136, the rendered electronic document 139 may be updated in response to the user input respecting the data grid 136 or may be updated in response to a user-selected update request. In one embodiment, a new electronic document 118 is created and then rendered as the rendered electronic document 139. In another embodiment, the existing electronic document 118 may be manipulated in memory by the form management application 109 and re-rendered by the electronic document application 115.

It is noted that a user may perform an action relating to multiple form field definitions 130 and/or multiple form fields 127 using the data grid 136. In some cases, an action may relate to multiple forms 124 from multiple electronic documents 118. Additionally, various tools of the spreadsheet application 112 may be available to manipulate data of the data grid 136, which may then be reflected in the rendered electronic document 139.

For example, a data grid 136 may show the form fields 127 listed according to the tab order of a form 124. A user may use a sort function of the spreadsheet application 112 to reorder the form fields 127 alphabetically by field name. Then, the user may apply the change to the rendered electronic document 139, and a new tab order may be adopted according to the sort of the data grid 136. Other possible form field 127 modifications that may be made using the data grid 136 may include, for example, changes to field type, changes to field size, creation and editing of drop-down fields, colors for drop-down fields, field fonts, and/or other modifications.

In one embodiment, tools may be available to verify the integrity of the data in the data grid 136 and to normalize the data if necessary. For example, the options available for a form field 127 that is a drop-down box may be analyzed with respect to a data dictionary 121. The options may be standardized according to the data dictionary 121. Further, if multiple electronic documents 118 are to be combined into one electronic document 118, form fields 127 having duplicate names may be renamed to meet a uniqueness constraint.

Figure 2:
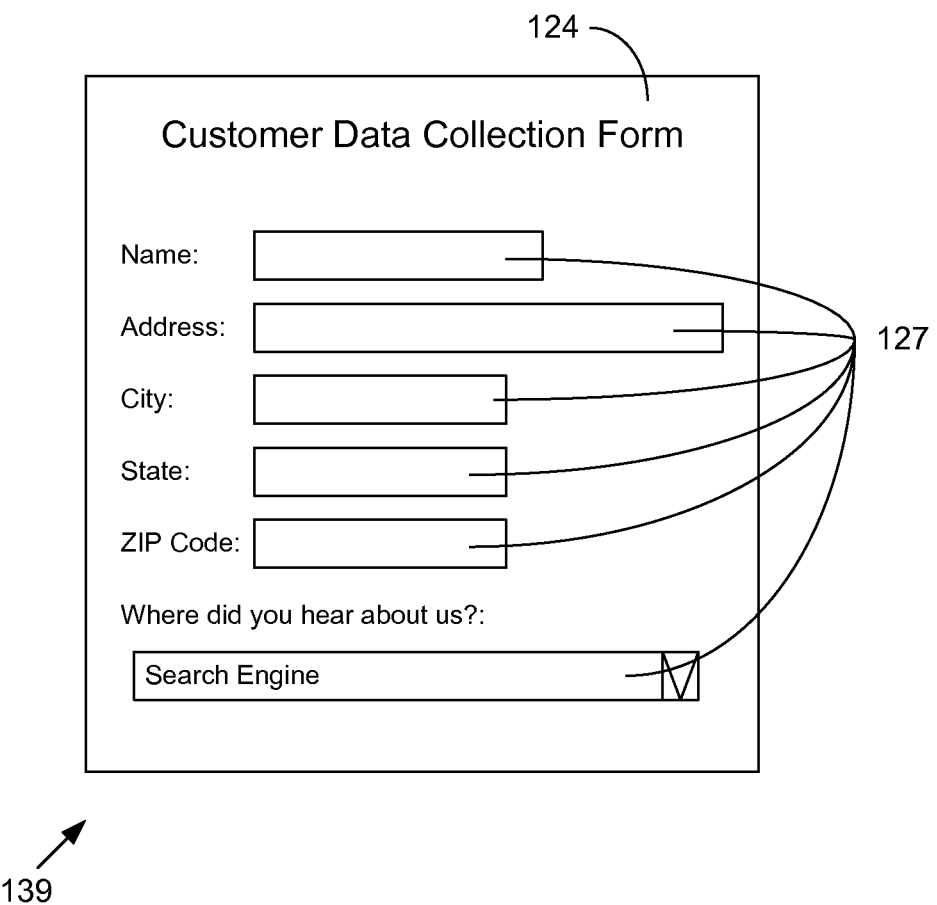
FIG. 2 is a drawing of an example of an electronic document rendered by the computing device of FIG. 1 according to various embodiments of the present disclosure.

Referring next to FIG. 2, shown is one example of a rendered electronic document 139 that is generated through the electronic document application 115 (FIG. 1) executed in the computing device 100 (FIG. 1). The rendered electronic document 139 includes a form 124 related to customer data collection. The form 124 of FIG. 2 includes multiple form fields 127 to collect, for example, the name, address, city, state, and postal code of the customer. The form 124 in FIG. 2 also includes a drop-down form field 127 for the customer to select a referral source, e.g., a search engine or another referral source. The electronic document 118 (FIG. 1) corresponding to the rendered electronic document 139 may be filled out and saved by the customer in an autonomous and disconnected manner. The fields of the generated form are based on fields extracted from forms loaded by the electronic document application 115. It may be the case that only unique fields in the electronic document 118 are automatically included by the form management application 109 (FIG. 1) in the rendered electronic document 139. For example, while an address form field 127 may be found in multiple forms, it may be placed only once in the rendered electronic document 139 by the form management application 109 (FIG. 1).

Figure 3A:
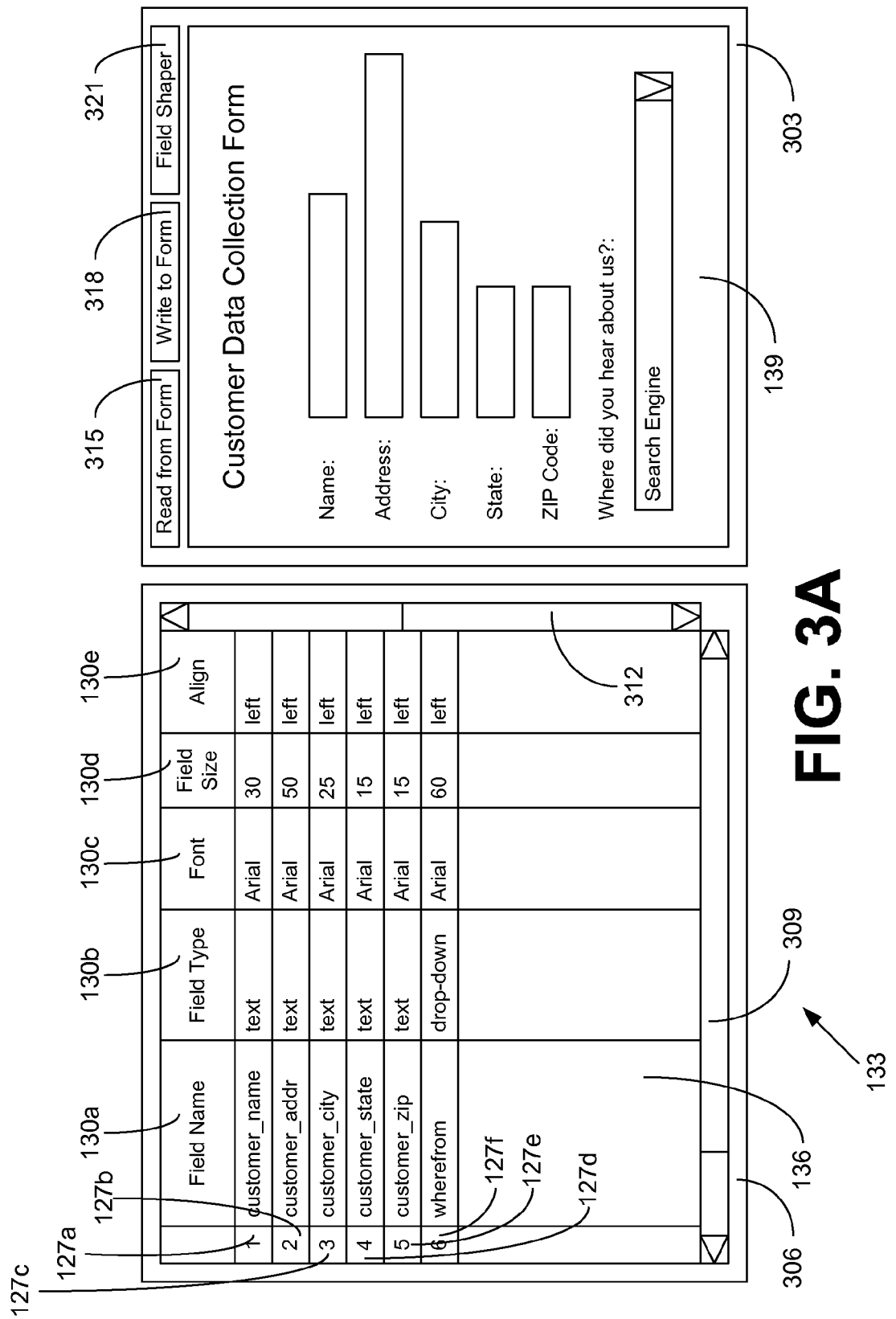
FIGS. 3A-3C are drawings of examples of a user interface rendered by the computing device of FIG. 1 according to various embodiments of the present disclosure.

Turning now to FIG. 3A, shown is one example of a user interface 133 rendered by the form management application 109 (FIG. 1) in the computing device 100 (FIG. 1). The user interface 133 includes an electronic document portion 303, which in turn includes the rendered electronic document 139 as depicted in FIG. 2. In one embodiment, the electronic document portion 303 is rendered by the electronic document application 115 (FIG. 1). In another embodiment, the rendered electronic document 139 is rendered by the electronic document application 115, while the surrounding electronic document portion 303 is rendered by the form management application 109.

The user interface 133 also includes a data grid portion 306, which in turn includes a data grid 136. Although the data grid portion 306 and the electronic document portion 303 are shown in the same user interface 133, it is understood that the data grid portion 306 and the electronic document portion 303 may be shown on the same display 103 (FIG. 1) or different displays 103. In one embodiment, the data grid portion 306 is rendered by a spreadsheet application 112 (FIG. 1), and the data grid 136 corresponds to a spreadsheet. Additional buttons and other user interface components associated with the spreadsheet application 112 may be present in the data grid portion 306. Components rendered by the form management application 109 may also be present in the data grid portion 306 in some embodiments. The data grid 136 may be larger than the available space on the display 103. If so, a horizontal scrollbar 309 and/or a vertical scrollbar 312 may be rendered to facilitate display of other portions of the data grid 136.

The data grid 136 may be organized, for example, into rows and columns. For example, the form fields 127 (FIG. 1) may be organized along a first axis, and the form field definitions 130 (FIG. 1) corresponding to the form fields 127 may be organized along a second axis. As shown in FIG. 3A, six form fields 127a, 127b, 127c, 127d, 127e, and 127f are described in the data grid 136, one in each row of the data grid 136. The columns of the data grid 136 correspond to form field definitions 130a, 130b, 130c, 130d, and 130e. In the example of FIG. 3A, the form field definitions 130a, 130b, 130c, 130d, and 130e correspond, respectively, to field name, field type, font, field size, and alignment.

Additional form field definitions 130 may be present in the data grid 136 and accessed by scrolling the viewport of the data grid 136 using the horizontal scrollbar 309. In some embodiments, one or more form fields 127 may not have all of the form field definitions 130 that other ones of the form fields 127 have. In such a case, the cell corresponding to the intersection of the form field row and field definition column may be empty or occupied by a placeholder.

In the non-limiting example of FIG. 3A, the electronic document portion 303 of the user interface 133 includes various user interface components associated with the form management application 109. In particular, the electronic document portion 303 includes a read form component 315, a write form component 318, and a field shaper component 321. The read form component 315, write form component 318, and the field shaper component 321 are depicted as buttons but may be other user interface components in other examples.

The read form component 315, when selected, reads the metadata from an electronic document 118 loaded by the electronic document application 115 and generates a data grid 136 with the corresponding form data. The write form component 318, when selected, writes the modified form information from the data grid 136 to the electronic document 118. The field shaper component 321, when selected, launches a field management utility of the form management application 109 that will be described in connection with FIG. 4.

Figure 3B:
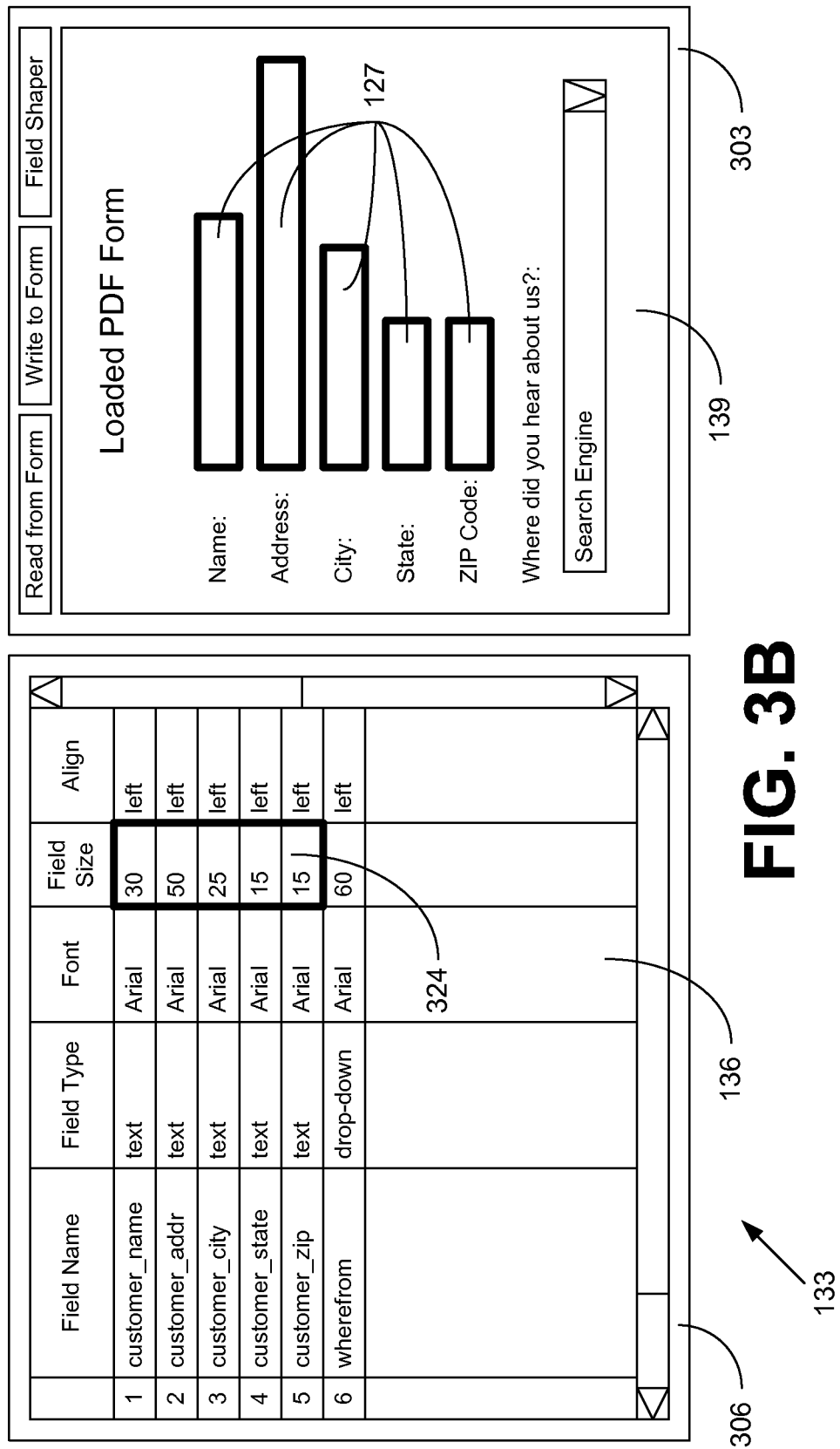

Moving on to FIG. 3B, shown is another example of a user interface 133 rendered by the form management application 109 (FIG. 1) in the computing device 100 (FIG. 1). In FIG. 3B, a user has made a selection 324 corresponding to form field definitions 130d (FIG. 1) for each one of the form fields 127a, 127b, 127c, 127d, and 127e (FIG. 1). The selection 324 may be emphasized in the data grid 136 using a border, highlighting, bold text, or another form of emphasis. In response to the selection 324 being made, the form management application 109 has also emphasized the corresponding form fields 127 in the rendered electronic document 139.

Figure 3C:
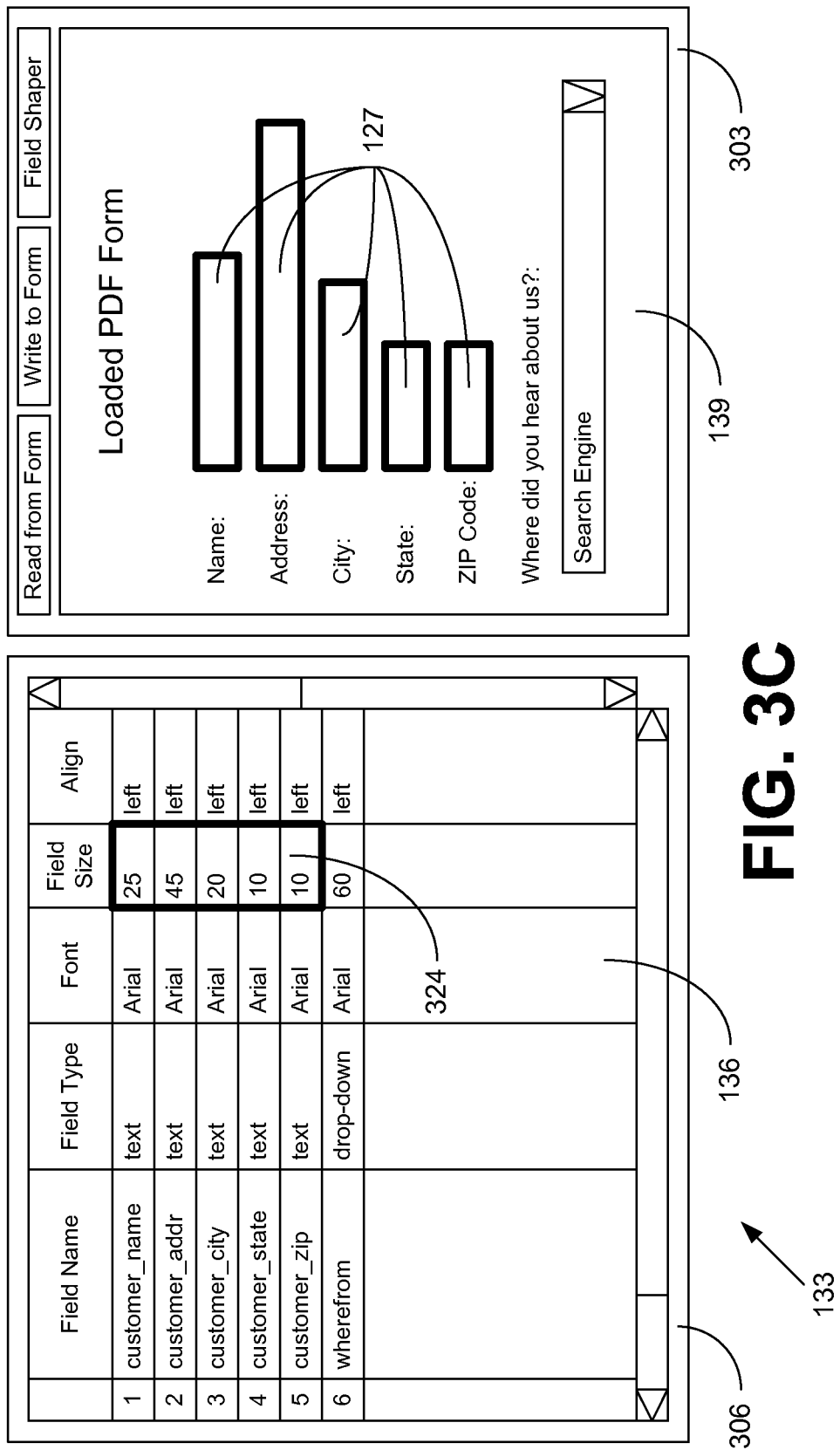

Continuing on to FIG. 3C, shown is yet another example of a user interface 133 rendered by the form management application 109 (FIG. 1) in the computing device 100 (FIG. 1). In FIG. 3C, the user has modified the data contained in the cells of the data grid 136 encompassed within the selection 324. In this case, the user has applied a formula through the spreadsheet application 112 (FIG. 1) to reduce the field size of each of the selected form fields 127a-127e (FIG. 3A) by 5. Accordingly, while in FIG. 3B the corresponding cells show 30, 50, 25, 15, and 15, in FIG. 3C, the corresponding cells show 25, 45, 20, 10, and 10. Moreover, the rendered electronic document 139 has been updated to reduce the size of the emphasized form fields 127.

It is noted that multiple form fields of the rendered electronic document 139 may be modified based upon user input respecting multiple cells of the data grid 136. Therefore, a user need not select and modify each form field 127 separately. Also, tools of the spreadsheet application 112 may be employed to facilitate potentially complex modifications of multiple form fields 127. As a non-limiting example, the form fields 127 may be given modified field names in bulk by prepending some prefix to an existing field name. If the user is satisfied with the change to the rendered electronic document 139, the corresponding electronic document 118 (FIG. 1) may be saved by activating the write form component 318 (FIG. 3B).

Figure 4:
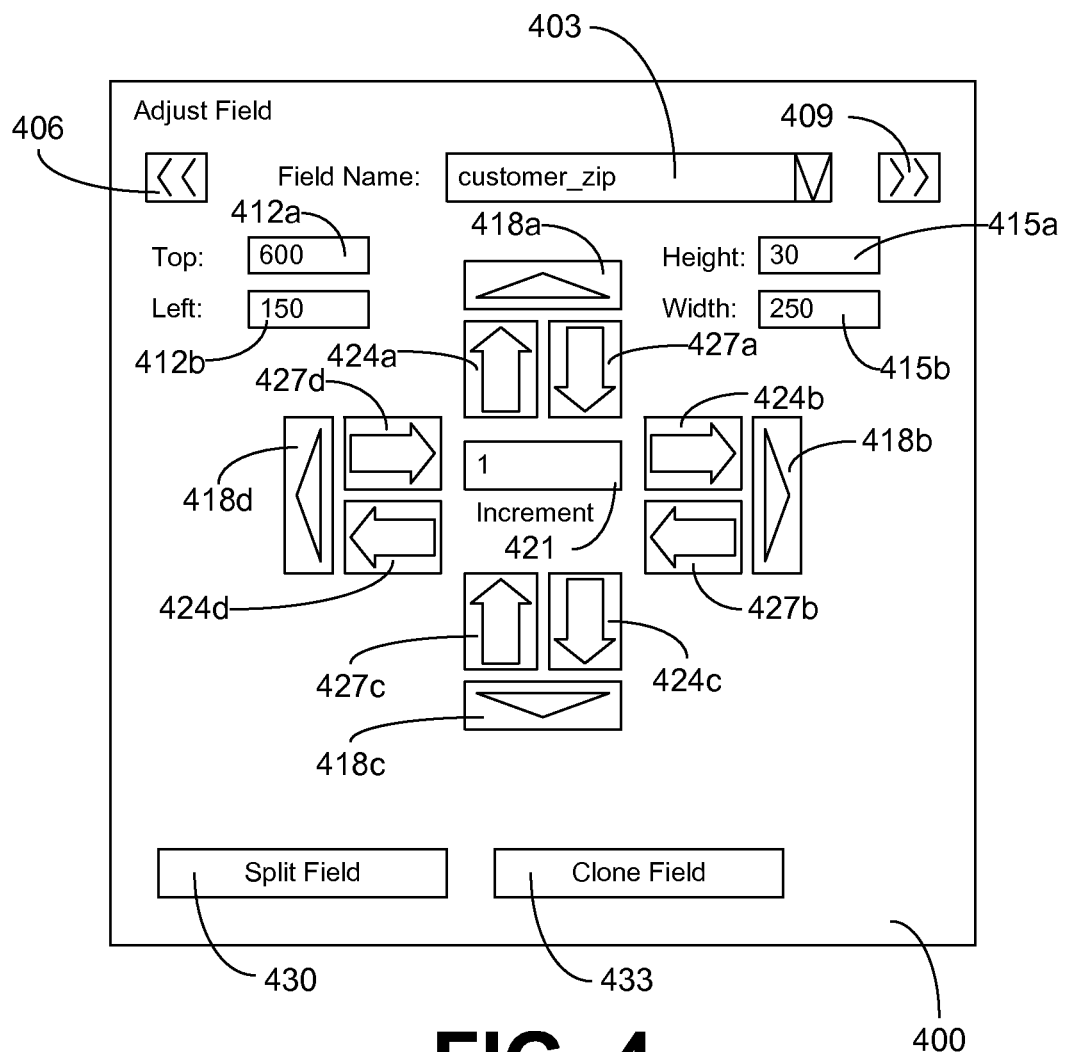
FIG. 4 is a drawing of another example of a user interface rendered by the computing device of FIG. 1 according to various embodiments of the present disclosure.

Turning now to FIG. 4, shown is an example of a field management user interface 400 rendered by the form management application 109 (FIG. 1) in the computing device 100 (FIG. 1). In one embodiment, the field management user interface 400 is rendered in conjunction with the user interface 133 (FIG. 1) so that the rendered electronic document 139 (FIG. 1) may be viewable at the same time on a display 103 (FIG. 1). The field management user interface 400 facilitates the adjustment of various parameters for form fields 127 (FIG. 1) that affect visual characteristics of the form fields 127. For example, the field management user interface 400 may allow a user to change a dimension of a form field 127 (e.g., width, height, etc.). The field management user interface 400 may also allow a user to change the position of the form field 127 within a page of the electronic document 118 (FIG. 1).

The example of the field management user interface 400 shown in FIG. 4 is configured to adjust the "customer_zip" form field 127e shown in FIG. 3A. A drop-down box 403 indicates that the "customer_zip" form field 127e is currently selected, though other form fields 127 may potentially be selected. A previous field component 406 and a next field component 409 may be used to jump to the previous or next form field 127 of the form 124 (FIG. 1) of the electronic document 118, for example, in tab order or in some other order.

Coordinate entry fields 412a and 412b may allow a user to enter coordinates that define a position of the form field 127 within the page of the electronic document 118. To this end, the coordinate entry fields 412 may control the positioning of the top-left corner of the form field 127 or some other reference point relative to the top-left corner of the page or some other reference point. Dimension entry fields 415a and 415b may allow a user to enter dimension values that define the size of a form field 127. As a non-limiting example, the dimension entry fields 415 may respectively define the height and width of a form field 127.

The field management user interface 400 may include movement components 418a, 418b, 418c, and 418d for moving the form field 127 up, to the right, down, or to the left, respectively, within the electronic document 118. In this non-limiting example, the movement components 418a, 418b, 418c, and 418d are buttons. When a movement component 418a, 418b, 418c, or 418d is selected, the form field 127 is moved on the rendered electronic document 139 (FIG. 1) by a predefined increment. The predefined increment may be configured by the user through an increment field 421 of the field management user interface 400. The increment may be specified in points, pixels, inches, millimeters, or other type of measurement.

The field management user interface 400 may include expansion components 424a, 424b, 424c, and 424d for expanding the form field 127 outwardly from a top side, from a right side, from a bottom side, or a left side, respectively. In this non-limiting example, the expansion components 424a, 424b, 424c, and 424d are buttons. When an expansion component 424a, 424b, 424c, or 424d is selected, the form field 127 is expanded outwardly by a predefined, potentially configurable, increment which may be the same increment or a different increment from that specified in the increment field 421.

The field management user interface 400 may include contraction components 427a, 427b, 427c, and 427d for contracting the form field 127 inwardly from a top side, from a right side, from a bottom side, or a left side, respectively. In this non-limiting example, the contraction components 427a, 427b, 427c, and 427d are buttons. When a contraction component 427a, 427b, 427c, or 427d is selected, the form field 127 is contracted inwardly by a predefined, potentially configurable, increment which may be the same increment or a different increment from that specified in the increment field 421.

When the movement components 418, expansion components 424, or contraction components 427 are selected, the rendered electronic document 139 may be updated in response to show the modification being applied to the form field 127 of the electronic document 118. Likewise, when the user enters a new value in the coordinate entry fields 412 or the dimension entry fields 415, the rendered electronic document 139 may be updated in response. Further, the coordinate entry fields 412 and/or dimension entry fields 415 may be updated with new values after the movement components 418, expansion components 424, or contraction components 427 are selected. After the rendered electronic document 139 is modified, the user may select the write form component 318 (FIG. 1) to save the modifications to the electronic document 118.

The field management user interface 400 may include a split field component 430. When selected, the split field component 430 may cause the form management application 109 to split the form field 127 into two form fields 127 that are side-by-side or arranged according to another predefined arrangement. The field management user interface 400 may include a clone field component 433. When selected, the clone field component 433 may cause the form management application 109 to duplicate the form field 127 into another form field 127 having the same characteristics. Both the split field component 430 and the clone field component 433 may modify the names of one or more of the two form fields 127 to ensure that there is no namespace collision.

Figure 5:
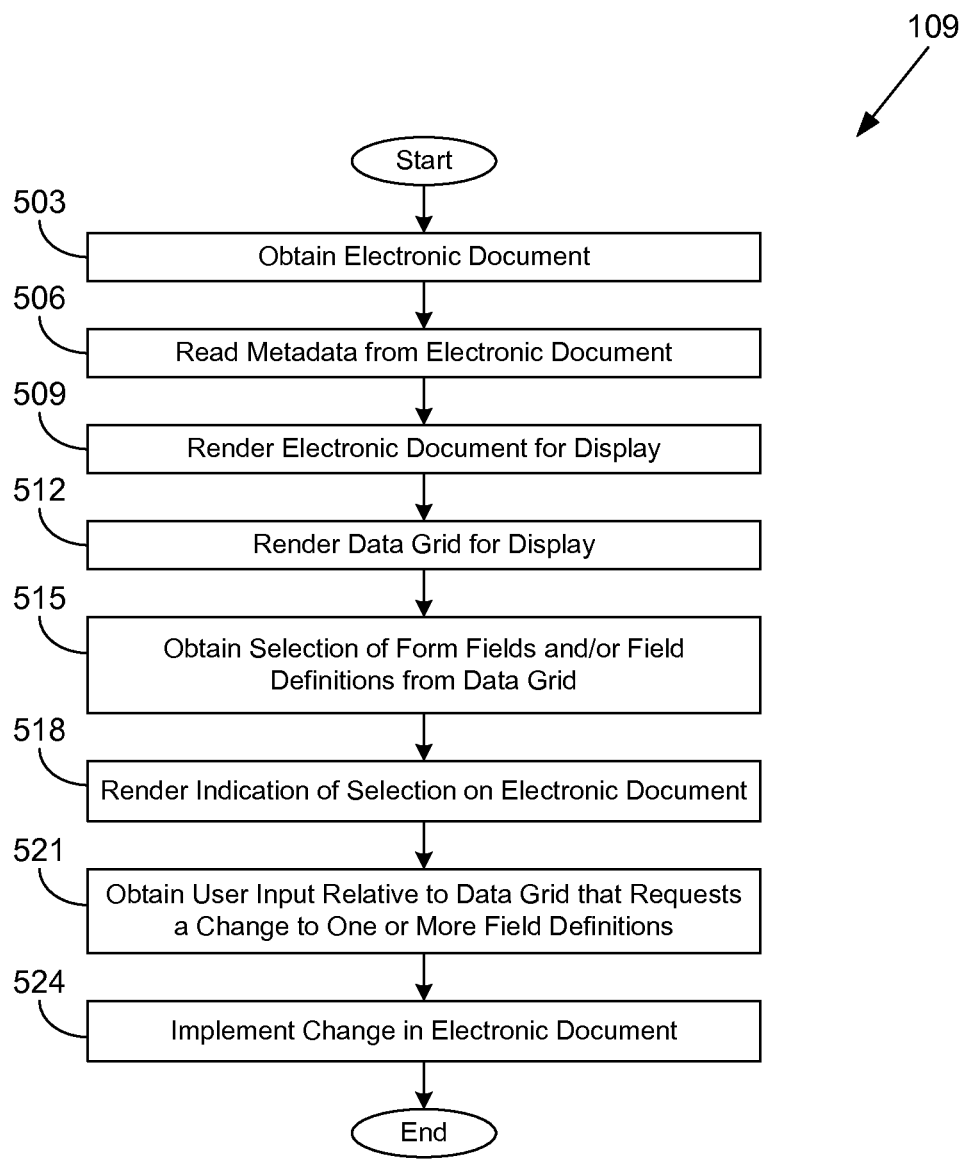
FIGS. 5-7 are flowcharts illustrating examples of functionality implemented as portions of a form management application executed in the computing device of FIG. 1 according to various embodiments of the present disclosure.

Referring next to FIG. 5, shown is a flowchart that provides one example of the operation of a portion of the form management application 109 according to various embodiments. It is understood that the flowchart of FIG. 5 provides merely an example of the many different types of functional arrangements that may be employed to implement the operation of the portion of the form management application 109 as described herein. As an alternative, the flowchart of FIG. 5 may be viewed as depicting an example of steps of a method implemented in the computing device 100 (FIG. 1) according to one or more embodiments.

Beginning with box 503, the form management application 109 obtains an electronic document 118 (FIG. 1). For example, the user may open an electronic document 118 using the electronic document application 115 (FIG. 1), which may then launch the form management application 109 to manage that electronic document 118. Alternatively, the user may employ the form management application 109 to open a particular electronic document 118. In box 506, the form management application 109 reads metadata from the electronic document 118. For example, the form management application 109 may load the metadata through an application programming interface (API) of the electronic document application 115.

In box 509, the form management application 109 renders the electronic document 118 for display as a rendered electronic document 139 (FIG. 1), possibly through the electronic document application 115 or another application. In box 512, the form management application 109 generates a data grid 136 (FIG. 1) from the metadata and renders the data grid 136 for display, possibly through the spreadsheet application 112 (FIG. 1) or another application. In box 515, the form management application 109 obtains a selection 324 (FIG. 3B) of one or more form fields 127 (FIG. 1) and/or form field definitions 130 (FIG. 1) by way of user input relative to the data grid 136.

In box 518, the form management application 109 renders an indication of the selection 324 on the rendered electronic document 139. For example, as in FIG. 3B, form fields 127 that are selected may be shown with an emphasized border in the rendered electronic document 139. In box 521, the form management application 109 obtains user input relative to the data grid 136 that requests a change to one or more form field definitions 130 for one or more form fields 127. In box 524, the form management application 109 implements the requested change in the rendered electronic document 139, which may then be saved if desired. Thereafter, the portion of the form management application 109 ends.

Figure 6:
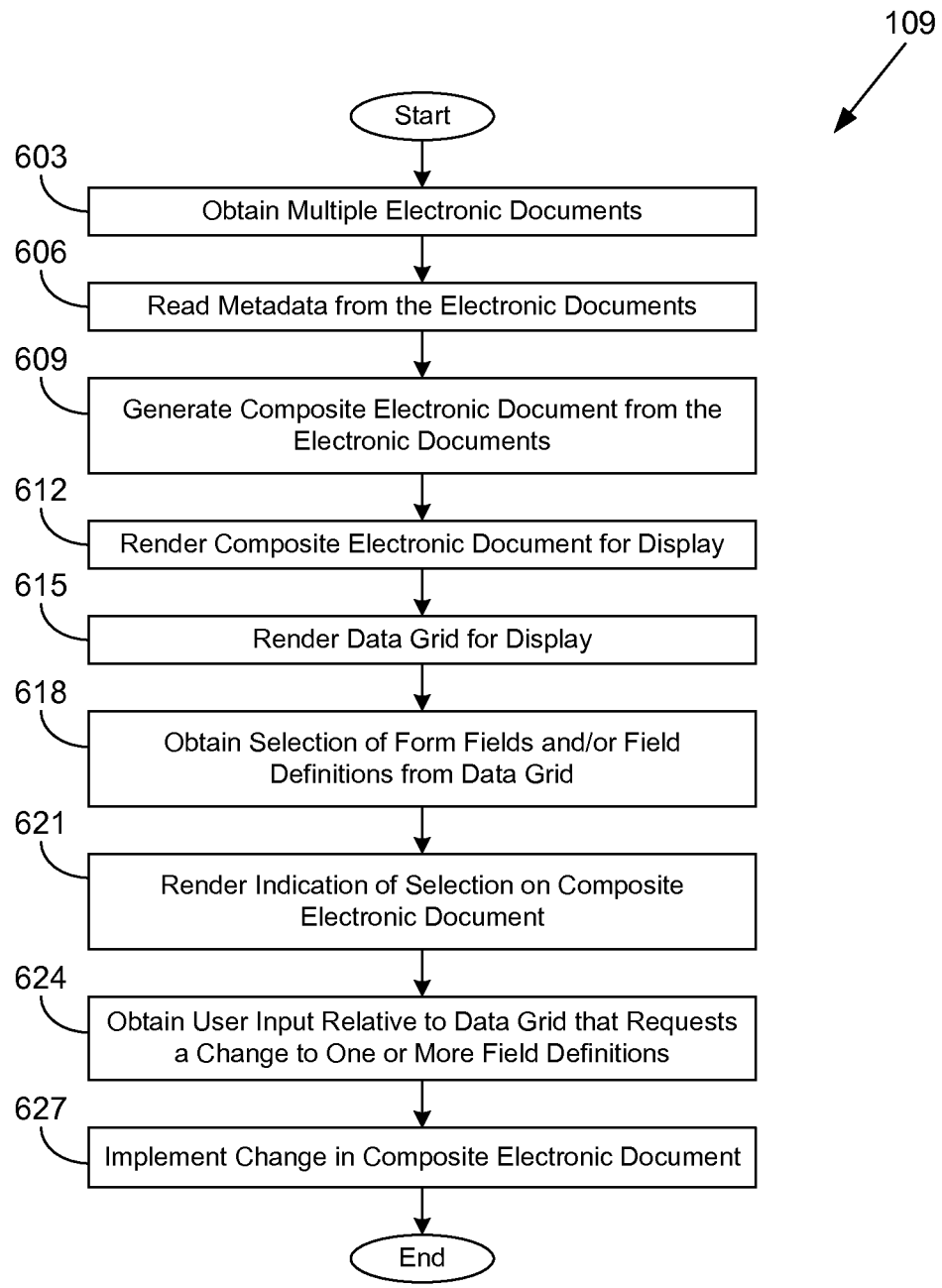

Moving on to FIG. 6, shown is a flowchart that provides one example of the operation of another portion of the form management application 109 according to various embodiments. It is understood that the flowchart of FIG. 6 provides merely an example of the many different types of functional arrangements that may be employed to implement the operation of the portion of the form management application 109 as described herein. As an alternative, the flowchart of FIG. 6 may be viewed as depicting an example of steps of a method implemented in the computing device 100 (FIG. 1) according to one or more embodiments.

Beginning with box 603, the form management application 109 obtains multiple electronic documents 118 (FIG. 1). For example, a user may employ the form management application 109 to open a particular set of electronic documents 118 or specify a particular directory containing multiple electronic documents 118. In box 606, the form management application 109 reads metadata from the electronic documents 118. For example, the form management application 109 may load the metadata through an application programming interface (API) of the electronic document application 115 (FIG. 1). In box 609, the form management application 109 generates a composite electronic document 118 from the multiple electronic documents 118. For example, the electronic documents 118 may be concatenated together according to a user-specified order or a predefined order such as alphabetically according to file name or another order.

In box 612, the form management application 109 renders the composite electronic document 118 for display as a rendered electronic document 139 (FIG. 1), possibly through the electronic document application 115 or another application. In box 615, the form management application 109 generates a data grid 136 (FIG. 1) from the metadata and renders the data grid 136 for display, possibly through the spreadsheet application 112 (FIG. 1) or another application. The data grid 136 corresponds to the composite electronic document 118, which may include multiple forms 124. To facilitate uniqueness constraints for form fields 127 (FIG. 1), the form management application 109 may be configured to rename form fields 127 automatically using prefixes, suffixes, or some other approach.

In box 618, the form management application 109 obtains a selection 324 (FIG. 3B) of one or more form fields 127 and/or form field definitions 130 (FIG. 1) by way of user input relative to the data grid 136. It is noted that the selection 324 may relate to form fields 127 contained in multiple electronic documents 118 of the composite electronic document 118. In box 621, the form management application 109 renders an indication of the selection 324 on the rendered composite electronic document 139. For example, as in FIG. 3B, form fields 127 that are selected may be shown with an emphasized border in the rendered electronic document 139. In box 624, the form management application 109 obtains user input relative to the data grid 136 that requests a change to one or more form field definitions 130 for one or more form fields 127. In box 627, the form management application 109 implements the requested change in the rendered composite electronic document 139, which may then be saved if desired. Thereafter, the portion of the form management application 109 ends.

Figure 7:
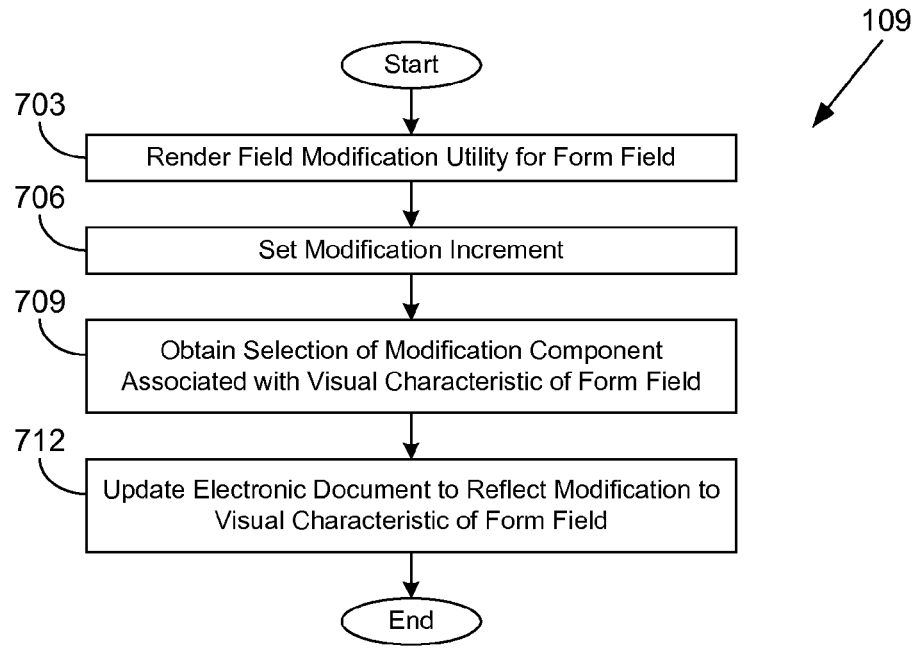

Turning now to FIG. 7, shown is a flowchart that provides one example of the operation of yet another portion of the form management application 109 according to various embodiments. Specifically, FIG. 7 relates to the field management user interface 400 depicted in FIG. 4. It is understood that the flowchart of FIG. 7 provides merely an example of the many different types of functional arrangements that may be employed to implement the operation of the portion of the form management application 109 as described herein. As an alternative, the flowchart of FIG. 7 may be viewed as depicting an example of steps of a method implemented in the computing device 100 (FIG. 1) according to one or more embodiments.

Beginning with box 703, the form management application 109 renders a field modification utility for a form field 127 (FIG. 1). The form field 127 may be a currently selected form field 127 from the user interface 133 (FIG. 1), a default form field 127, or another form field 127. In box 706, the form management application 109 sets a modification increment. The increment may be set based on a default value or a user configurable value. The increment may correspond to points, pixels, inches, millimeters, or some other units.

In box 709, the form management application 109 obtains a selection of a modification component associated with a visual characteristic of the form field 127. For example, the modification component may be one of the movement components 418 (FIG. 4), expansion components 424 (FIG. 4), contraction components 427 (FIG. 4), or other components. In box 712, the form management application 109 updates the electronic document 118 (FIG. 1) to reflect a modification to the visual characteristic of the form field 127. The modification may be made according to the modification increment set in box 706. Thereafter, the portion of the form management application 109 ends.

Figure 8:
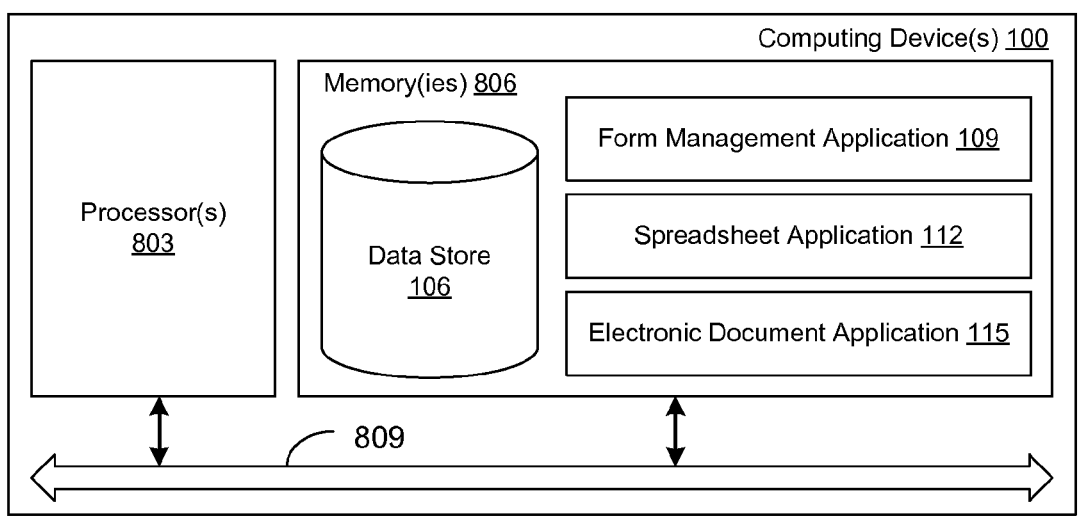
FIG. 8 is a schematic block diagram that provides one example illustration of the computing device of FIG. 1 according to various embodiments of the present disclosure.

With reference to FIG. 8, shown is a schematic block diagram of the computing device 100 according to an embodiment of the present disclosure. The computing device 100 includes at least one processor circuit, for example, having a processor 803 and a memory 806, both of which are coupled to a local interface 809. To this end, the computing device 100 may comprise, for example, at least one server computer, client computer, or like device. The local interface 809 may comprise, for example, a data bus with an accompanying address/control bus or other bus structure as can be appreciated.

Stored in the memory 806 are both data and several components that are executable by the processor 803. In particular, stored in the memory 806 and executable by the processor 803 are form management application 109, the spreadsheet application 112, the electronic document application 115, and potentially other applications. Also stored in the memory 806 may be a data store 106 and other data. In addition, an operating system may be stored in the memory 806 and executable by the processor 803.

It is understood that there may be other applications that are stored in the memory 806 and are executable by the processor 803 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Delphi®, Flash®, or other programming languages.

A number of software components are stored in the memory 806 and are executable by the processor 803. In this respect, the term "executable" means a program file that is in a form that can ultimately be run by the processor 803. Examples of executable programs may be, for example, a compiled program that can be translated into machine code in a format that can be loaded into a random access portion of the memory 806 and run by the processor 803, source code that may be expressed in proper format such as object code that is capable of being loaded into a random access portion of the memory 806 and executed by the processor 803, or source code that may be interpreted by another executable program to generate instructions in a random access portion of the memory 806 to be executed by the processor 803, etc. An executable program may be stored in any portion or component of the memory 806 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 806 is defined herein as including both volatile and nonvolatile memory and data storage components. Volatile components are those that do not retain data values upon loss of power. Nonvolatile components are those that retain data upon a loss of power. Thus, the memory 806 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 803 may represent multiple processors 803 and the memory 806 may represent multiple memories 806 that operate in parallel processing circuits, respectively. In such a case, the local interface 809 may be an appropriate network that facilitates communication between any two of the multiple processors 803, between any processor 803 and any of the memories 806, or between any two of the memories 806, etc. The local interface 809 may comprise additional systems designed to coordinate this communication, including, for example, performing load balancing. The processor 803 may be of electrical or of some other available construction.

Although the form management application 109, the spreadsheet application 112, the electronic document application 115, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIGS. 5-7 show the functionality and operation of an implementation of portions of the form management application 109. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 803 in a computer system or other system. The machine code may be converted from the source code, etc. If embodied in hardware, each block may represent a circuit or a number of interconnected circuits to implement the specified logical function(s).

Although the flowcharts of FIGS. 5-7 show a specific order of execution, it is understood that the order of execution may differ from that which is depicted. For example, the order of execution of two or more blocks may be scrambled relative to the order shown. Also, two or more blocks shown in succession in FIGS. 5-7 may be executed concurrently or with partial concurrence. Further, in some embodiments, one or more of the blocks shown in FIGS. 5-7 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the form management application 109, the spreadsheet application 112, and the electronic document application 115, that comprises software or code can be embodied in any non-transitory computer-readable medium for use by or in connection with an instruction execution system such as, for example, a processor 803 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A computer-implemented method for modifying an electronic document comprising:
    receiving an electronic document, the electronic document preformatted in portable document format and comprising a number of form fields, wherein each form field of the number of form fields is defined by metadata of one or more metadata types;
    in response to receiving the electronic document, generating a rendered electronic document, the rendered electronic document comprising temporary data representing the received electronic document, wherein the rendered electronic document provides a preview of changes to the received electronic document;
    generating one or more data cells arranged in a data grid organized by form field and metadata type, displayed in a user interface, and comprising content corresponding to at least the metadata defining the number of form fields;

receiving, at the user interface, a proposed modification of a plurality of form fields comprising receiving a selection of more than one data cell corresponding to the plurality of form fields and a simultaneous change to the content of each of the selected more than one data cells;

in response to receiving the proposed modification, transforming the temporary data of the rendered electronic document based on the proposed modification and displaying the proposed modification via the rendered electronic document;

receiving a confirmation to make the proposed modification to the received electronic document; and in response to receiving the confirmation to make the proposed modification to the received electronic document, generating a modified electronic document reflecting the change to each of the plurality of form fields.

2. The computer-implemented method of claim 1, the method further comprising mapping the metadata of the number of form fields to the one or more data cells of the data grid.

3. The computer-implemented method of claim 1, wherein generating the modified electronic document comprises:

in response to receiving the confirmation to make the proposed modification to the received electronic document, modifying the metadata of the received electronic document based on the proposed modification.

4. The computer-implemented method of claim 1, wherein generating the modified electronic document comprises:

in response to receiving the confirmation to make the modification to the received electronic document:
copying the metadata of the received electronic document to generate a new electronic document; and
modifying the metadata of the new electronic document to reflect the proposed modification to the plurality of form fields to generate the modified electronic document.

5. The computer-implemented method of claim 1, wherein:
the user interface is a first user interface;
the metadata defining the number of form fields comprises data defining one or more format parameters of each of the number of form fields; and
the method further comprises enabling a user to alter at least one format parameter of the number of form fields and generating a second user interface for enabling a user to manipulate the one or more format parameters.

6. The computer-implemented method of claim 5, the method further comprising:
receiving a proposed alteration at the second user interface to at least one format parameter of the number of form fields;
in response to receiving the proposed alteration to the at least one format parameter of the number of form fields, transforming the temporary data of the rendered electronic document based on the proposed alteration and displaying the proposed alteration on the rendered electronic document;
receiving confirmation to make the proposed alteration to the received electronic document; and
in response to receiving the confirmation to make the proposed alteration to the received electronic document, generating an altered electronic document, the altered electronic document reflecting the proposed alteration to the at least one format parameter.

7. The computer-implemented method of claim 6, wherein generating the modified electronic document comprises:

in response to receiving the confirmation to make the proposed alteration to the received electronic document, altering the metadata of the received electronic document based on the proposed alteration to the at least one format parameter of the number of form fields.

8. The computer-implemented method of claim 6, wherein generating the altered electronic document comprises:

in response to receiving the confirmation to make the proposed alteration to the received electronic document:
copying the metadata of the received electronic document to generate a new electronic document; and
altering the metadata of the new electronic document to reflect the proposed alteration to the at least one format parameter of the number of form fields to generate the modified electronic document.

9. The computer-implemented method of claim 5, wherein enabling the user to alter at least one format parameter of the number of form fields comprises enabling the user to alter a spatial location of at least one of the number of form fields.

10. The computer-implemented method of claim 9, wherein the spatial location of at least one of the number of form fields is defined by a coordinate system based on a corner of the received electronic document and enabling the user to alter at least one format parameter further comprises enabling the user to alter the location of at least one of the number of form fields by altering one or more coordinates of the at least one of the number of form fields based on the coordinate system.

11. The computer-implemented method of claim 5, wherein enabling the user to alter at least one format parameter of the number of form fields comprises enabling the user to alter a spatial size of at least one of the number of form fields.

12. A system for modifying an electronic document, the system comprising:
at least one processor, the at least one processor operative to:
receive an electronic document, the electronic document preformatted in portable document format and comprising a number of form fields, wherein each form field of the number of form fields is defined by metadata of one or more metadata types;
in response to receiving the electronic document, generate a rendered electronic document, the rendered electronic document comprising temporary data representing the received electronic document, wherein the rendered electronic document provides a preview of changes to the received electronic document;
generate one or more data cell arranged in a data grid organized by form field and metadata type, displayed in a user interface, and comprising content corresponding to at least the metadata defining the number of form fields;
receive, at the user interface, a proposed modification of a plurality of form fields comprising receiving a selection of more than one data cells corresponding to the plurality of form fields and a simultaneous change to the content of each of the selected more than one data cells;
in response to receiving the proposed modification, transform the temporary data of the rendered electronic document based on the proposed modification and displaying the proposed modification via the rendered electronic document;
receive a confirmation to make the proposed modification to the received electronic document; and in response to receiving the confirmation to make the proposed modification to the received electronic document, generate a modified electronic document reflecting the change to each of the plurality of form fields.

13. The system of claim 12, the at least one processor further operative to map the metadata of the number of form fields to the one or more data cells of the data grid.

14. The system of claim 12, wherein generating the modified electronic document comprises:
    in response to receiving the confirmation to make the proposed modification to the received electronic document, modifying the metadata of the received electronic document based on the proposed modification.

15. The system of claim 12, wherein generating the modified electronic document comprises:
    in response to receiving the confirmation to make the modification to the received electronic document:
        copying the metadata of the received electronic document to generate a new electronic document; and
        modifying the metadata of the new electronic document to reflect the proposed modification to the plurality of form fields to generate the modified electronic document.

16. The system of claim 12, wherein:
    the user interface is a first user interface;
    the metadata defining the number of form fields comprises data defining one or more format parameters of each of the number of form fields; and
    the at least one processor is further operative to enable a user to alter at least one format parameter of the number of form fields and generate a second user interface for enabling a user to manipulate the one or more format parameters.

17. The system of claim 16, the at least one processor is further operative to:
    receive a proposed alteration at the second user interface to at least one format parameter of the number of form fields;
    in response to receiving the proposed alteration to the at least one format parameter of the number of form fields, transform the temporary data of the rendered electronic document based on the proposed alteration and displaying the proposed alteration on the rendered electronic document;
    receive confirmation to make the proposed alteration to the received electronic document; and
    in response to receiving the confirmation to make proposed alteration to the received electronic document, generate an altered electronic document, the altered electronic document reflecting the proposed alteration to the at least one format parameter.

18. The system of claim 17, wherein generating the modified electronic document comprises:
    in response to receiving the confirmation to make the proposed alteration to the received electronic document, altering the metadata of the received electronic document based on the proposed alteration to the at least one format parameter of the number of form fields.

19. The system of claim 17, wherein generating the modified electronic document comprises:
    in response to receiving the confirmation to make the proposed alteration to the received electronic document:
        copying the metadata of the received electronic document to generate a new electronic document; and
        altering the metadata of the new electronic document to reflect the proposed alteration to the at least one format parameter of the number of form fields to generate the modified electronic document.

20. The system of claim 16, wherein enabling the user to alter at least one format parameter of the number of form fields comprises enabling the user to alter a coordinate location of at least one of the number of form fields.

21. The system of claim 20, wherein the coordinate location of at least one of the number of form fields is defined by a coordinate system based on a corner of the received electronic document and enabling the user to alter at least one format parameter further comprises enabling the user to alter the location of at least one of the number of form fields by altering one or more coordinates of the at least one of the number of form fields based on the coordinate system.

22. The system of claim 16, wherein enabling the user to alter at least one format parameter of the number of form fields comprises enabling the user to alter a size of at least one of the number of form fields.

* * * * *